United States Patent
Niu et al.

(10) Patent No.: US 10,787,162 B2
(45) Date of Patent: Sep. 29, 2020

(54) DRIVING FORCE CONTROL APPARATUS

(71) Applicant: Honda Motor Co., Ltd., Tokyo (JP)

(72) Inventors: Chao Niu, Wako (JP); Shogo Takano, Wako (JP); Kota Saito, Wako (JP); Takashi Adachi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/528,322

(22) Filed: Jul. 31, 2019

(65) Prior Publication Data

US 2020/0047735 A1 Feb. 13, 2020

(30) Foreign Application Priority Data

Aug. 9, 2018 (JP) .................. 2018-150657

(51) Int. Cl.
*B60W 10/119* (2012.01)
*B60W 10/11* (2012.01)
*B60W 10/06* (2006.01)
*F16H 61/02* (2006.01)
*F16H 59/14* (2006.01)
*B60N 2/90* (2018.01)
*F16H 59/48* (2006.01)
*B60N 2/00* (2006.01)

(52) U.S. Cl.
CPC ............ *B60W 10/11* (2013.01); *B60N 2/002* (2013.01); *B60N 2/90* (2018.02); *B60W 10/06* (2013.01); *F16H 59/14* (2013.01); *F16H 59/48* (2013.01); *F16H 61/02* (2013.01)

(58) Field of Classification Search
CPC .... B60W 10/04; B60W 10/08; B60W 10/119; B60W 10/14; B60W 10/16; B60W 20/10; B60W 60/0013; B60W 2540/223; B60W 2540/00; B60W 2720/40; B60W 2720/403; B60W 2720/406
See application file for complete search history.

(56) References Cited

U.S. PATENT DOCUMENTS

2005/0131587 A1* 6/2005 Takamatsu ............ B60W 10/18
701/1
2008/0290618 A1* 11/2008 Yanaka .............. B60G 17/0161
280/6.15

(Continued)

FOREIGN PATENT DOCUMENTS

JP 2007153160 A 6/2007

*Primary Examiner* — Edwin A Young
(74) *Attorney, Agent, or Firm* — Duft & Bornsen, PC

(57) ABSTRACT

A driving force control apparatus including a posture detecting part detecting a riding posture of an occupant; an acceleration detecting part detecting an acceleration of a vehicle; a driving force generation part generating a driving force in a manner enabling to change a driving force distribution between a front and rear wheels or between a left and right wheels; and a microprocessor. The microprocessor is configured to perform calculating a required driving force, and controlling the driving force generation part so as to change the driving force distribution to a target driving force distribution to suppress a change of the riding posture while generating the required driving force when a magnitude of the acceleration is greater than or equal to a predetermined magnitude and a degree of change of the riding posture is greater than or equal to a predetermined degree.

18 Claims, 6 Drawing Sheets

(56) References Cited

U.S. PATENT DOCUMENTS

2015/0127240 A1* 5/2015 Nozawa ................ B60T 8/1706
                                                         701/82
2018/0236989 A1* 8/2018 Lian ......................... B60T 8/30
2019/0031138 A1* 1/2019 Boccuccia ............. B60N 2/646

* cited by examiner ated States Patent

DRIVING FORCE CONTROL APPARATUS

CROSS-REFERENCE TO RELATED APPLICATION

This application is based upon and claims the benefit of priority from Japanese Patent Application No. 2018-150657 filed on Aug. 9, 2018, the content of which is incorporated herein by reference.

BACKGROUND OF THE INVENTION

Field of the Invention

This invention relates to a driving force control apparatus configured to control driving force of a vehicle.

Description of the Related Art

Conventionally, there is a known apparatus that uses load sensors provided in a seat cushion and a seat back to detect change in load acting on the seat cushion and change in load acting on the seat back and that controls vehicle driving force so as to keep occupant-perceived acceleration owing to these changes within a comfortable range. Such an apparatus is disclosed in, for example, Japanese Unexamined Patent Publication No. 2007-153160 (JP2007-153160A).

In the apparatus taught by JP2007-153160A, however, the expedient of applying vehicle driving force control to keep perceived acceleration within a comfortable range is apt to result in vehicle actual driving force diverging greatly from required driving force.

SUMMARY OF THE INVENTION

An aspect of the present invention is a driving force control apparatus, including: a posture detecting part configured to detect a riding posture of an occupant; an acceleration detecting part configured to detect an acceleration of a vehicle; a driving force generation part configured to generate a driving force in a manner enabling to change a driving force distribution between a front wheel and a rear wheel or between a left wheel and a right wheel; and an electronic control unit having a microprocessor and a memory. The microprocessor is configured to perform: calculating a required driving force; and controlling the driving force generation part so as to change the driving force distribution to a target driving force distribution to suppress a change of the riding posture while generating the required driving force, when a magnitude of the acceleration detected by the acceleration detecting part is greater than or equal to a predetermined magnitude and a degree of change of the riding posture detected by the posture detecting part is greater than or equal to a predetermined degree.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
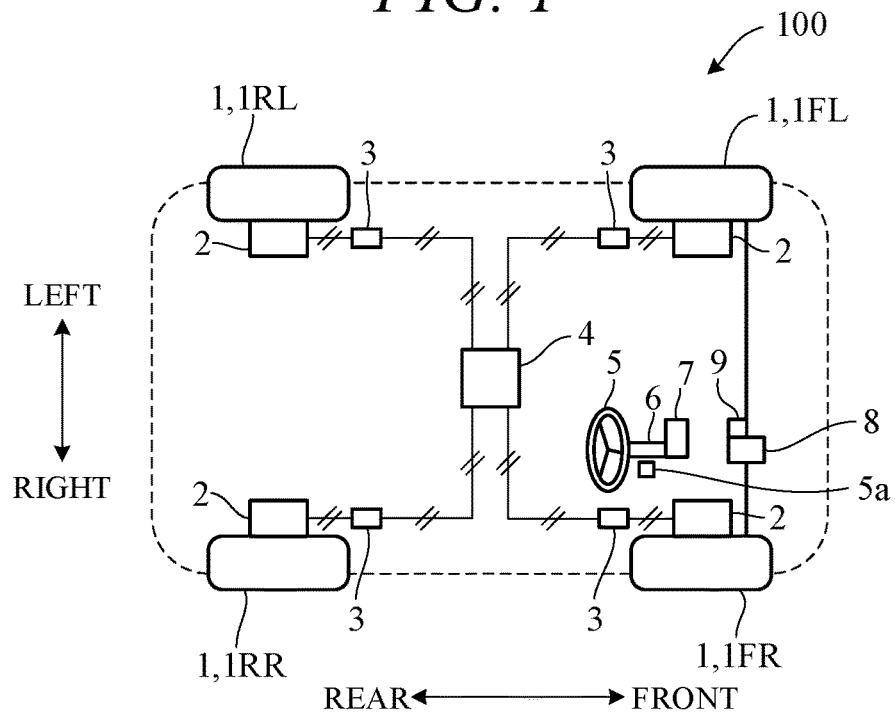
FIG. 1 is a diagram showing a configuration overview of a driving system of a vehicle incorporating a driving force control apparatus according to an embodiment of the invention.

Hereinafter, an embodiment of the present invention is explained with reference to FIGS. 1 to 8. First, configurations of a vehicle (also called "subject vehicle") to which the present embodiment is applied are explained. FIG. 1 is a diagram showing a configuration overview of a driving system of a vehicle 100 incorporating a driving force control apparatus according to an embodiment of the present invention. The vehicle 100 is a vehicle with a self-driving capability, i.e., self-driving vehicle. The vehicle 100 is not limited to driving in a self-drive mode requiring no driver driving operations but is also capable of driving in a manual drive mode by driver operations.

Figure 4:
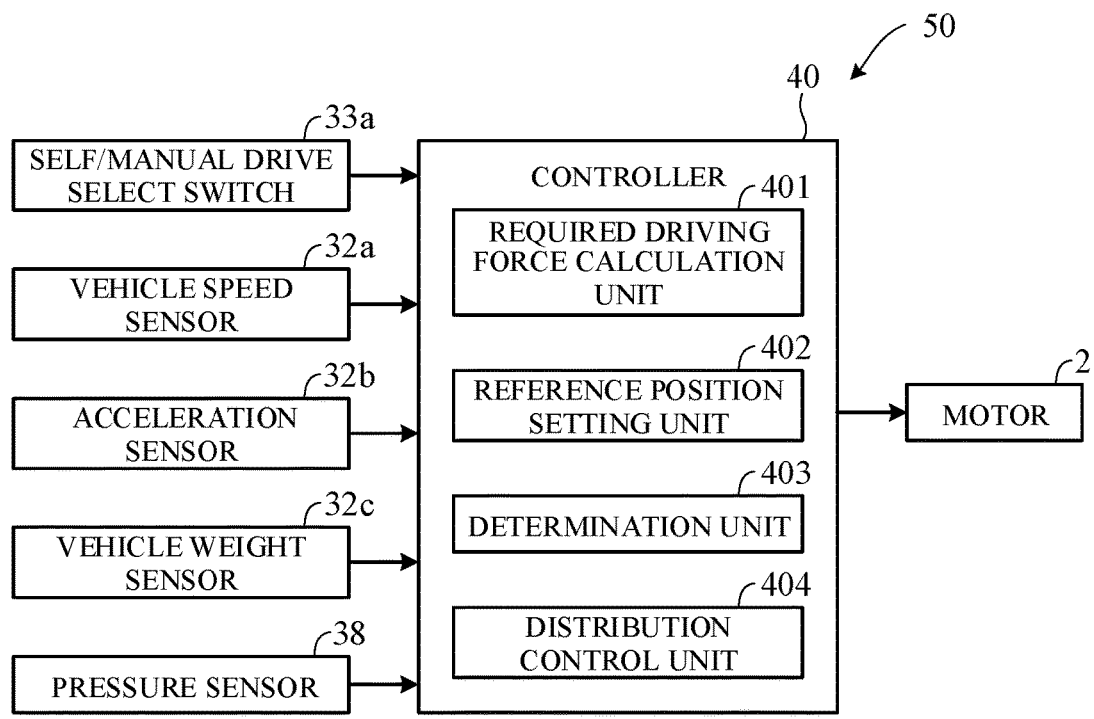
FIG. 4 is a block diagram illustrating main configuration of the driving force control apparatus according to the embodiment of the invention.

As shown in FIG. 1, the vehicle 100 is a four-wheel-drive vehicle whose four wheels 1 on front left and right, and rear left and right, namely, left and right front wheels 1FL, 1FR, and left and right rear wheels 1RL, 1RR, are all drive wheels. A motor (electric motor) 2 is connected to each of the drive wheels 1. The motors 2 are connected through inverters 3 to a battery 4 and are driven by power supplied from the battery 4. On the other hand, when the motors 2 are driven by external force, they generate electricity that is stored in the battery 4. Owing to provision of the motors 2 each in association with one of the drive wheels 1, the drive wheels 1 can be driven independently of one another. Driving of the motors 2 is controlled by the inverter 3 under control of a controller (FIGS. 2 and 4).

A steering wheel 5 to be rotationally operated by a driver is installed at a driver's seat. One end portion of a steering shaft 6 is connected to the steering wheel 5 to rotate integrally with the steering wheel 5. An amount of operation of the steering wheel 5 (steering angle) is detected by a steering sensor 5a. A steering actuator 7 is attached to the steering shaft 6. The steering actuator 7 is configured as an electric motor, for example. The steering actuator 7 drives to apply reaction force in response to driver steering wheel operation. Reaction force applied by the steering actuator 7 in response to driver steering wheel operation is greater in proportion as amount of operation of the steering wheel 5 is greater.

A steering gear box 8 of rack-and-pinion type, for example, is installed between the front left and right drive wheels 1FL and 1FR. A turning actuator 9 is attached to the steering gear box 8. The turning actuator 9 is, for example, an electric motor. In manual drive mode, the turning actuator 9 is driven in accordance with steering angle detected by the steering sensor 5a. The rack of the steering gear box 8 is driven to move left and right by the turning actuator 9 and thereby turn the front drive wheels 1FL and 1FR left and right in accordance with driver steering operations. In self-drive mode, on the other hand, the turning actuator 9 is driven to turn the drive wheels 1F1 and 1FR in target traveling direction of the vehicle disregarding driver steering operations.

Figure 2:
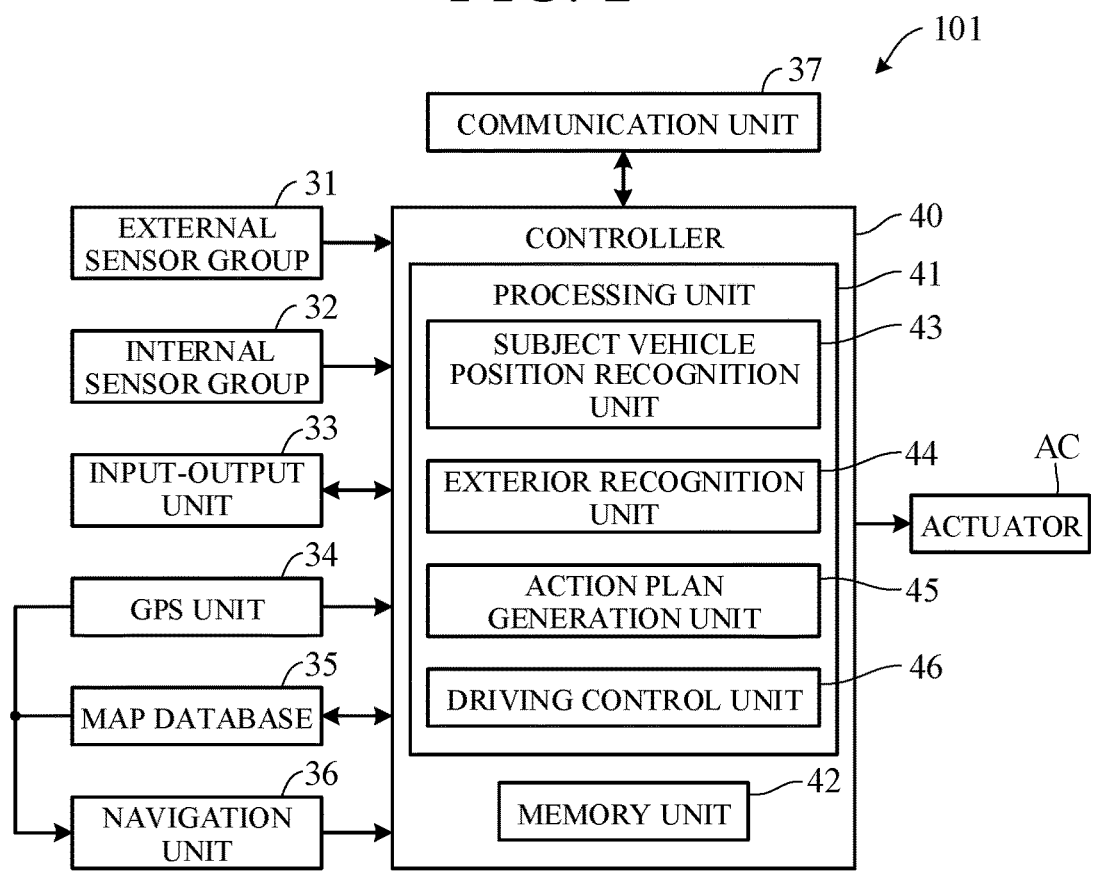
FIG. 2 is a block diagram schematically illustrating overall configuration of a vehicle control system including the driving force control apparatus according to the embodiment of the invention.

FIG. 2 is a block diagram schematically illustrating overall configuration of a vehicle control system 101 according to the present embodiment. As shown in FIG. 2, the vehicle control system 101 includes mainly the controller 40, and as members communicably connected with the controller 40 through CAN (Controller Area Network) communication or the like, an external sensor group 31, an internal sensor group 32, an input-output unit 33, a GPS unit 34, a map database 35, a navigation unit 36, a communication unit 37, and actuators AC for traveling.

The term external sensor group 31 herein is a collective designation encompassing multiple sensors (external sensors) for detecting external circumstances constituting vehicle ambience data. For example, the external sensor group 31 includes, inter alia, a LIDAR (Light Detection and Ranging) for measuring distance from the vehicle 100 to ambient obstacles by measuring scattered light produced by laser light radiated from the vehicle 100 in every direction, a RADAR (Radio Detection and Ranging) for detecting other vehicles and obstacles around the vehicle 100 by radiating electromagnetic waves and detecting reflected waves, and cameras having a CCD, CMOS or other image sensor and attached to the vehicle 100 for imaging ambience (forward, reward and sideways) of the vehicle 100.

The term internal sensor group 32 herein is a collective designation encompassing multiple sensors (internal sensors) for detecting driving state of the vehicle 100. For example, the internal sensor group 32 includes, inter alia, a vehicle speed sensor for detecting vehicle speed of the vehicle 100 and acceleration sensors for detecting forward-rearward direction acceleration and lateral acceleration of the vehicle 100, respectively, a yaw rate sensor for detecting rotation angle speed (yaw rate) around a vertical axis through center of gravity of the vehicle 100, and a vehicle weight sensor for detecting weight of the vehicle 100. The internal sensor group 32 also includes sensors (e.g., steering sensor 5a) for detecting driver driving operations in manual drive mode, including, for example, accelerator pedal operations, brake pedal operations, steering wheel 5 operations and the like.

The term input-output unit 33 is used herein as a collective designation encompassing apparatuses receiving instructions input by the driver and outputting information to the driver. The input-output unit 33 includes, inter alia, switches which the driver uses to input various instructions, a microphone which the driver uses to input voice instructions, a display for presenting information to the driver via displayed images, and a speaker for presenting information to the driver by voice. The switch of the input-output unit 33 includes a self/manual drive select switch for instructing a self-drive mode or manual drive mode.

The self/manual drive select switch, for example, is configured as a switch manually operable by the driver to output an instruction of switching to a self-drive mode enabling self-drive functions or a manual drive mode disabling self-drive functions in accordance with operation of the switch. Optionally, the self/manual drive select switch can be configured to instruct switching from manual drive mode to self-drive mode or from self-drive mode to manual drive mode without operating the self/manual drive select switch. For example, when a predetermined operation is made by a driver or a predetermined condition is satisfied, drive mode can be switched automatically to self-drive mode or manual drive mode.

The GPS unit 34 includes a GPS receiver (GPS sensor) for receiving position determination signals from multiple GPS satellites, and measures absolute position (latitude, longitude and the like) of the vehicle 100 based on the signals received from the GPS receiver.

The map database 35 is a unit storing general map data used by the navigation unit 36 and is, for example, implemented using a hard disk. The map data include road position data and road shape (curvature etc.) data, along with intersection and road branch position data. The map data stored in the map database 35 are different from high-accuracy map data stored in a memory unit 42 of the controller 40.

The navigation unit 36 retrieves target road routes to destinations input by the driver and performs guidance along selected target routes. Destination input and target route guidance is performed through the input-output unit 33. Destination can be automatically set not through the input-output unit 33. Target routes are computed based on current position of the vehicle 100 measured by the GPS unit 34 and map data stored in the map database 35.

The communication unit 37 communicates through networks including the Internet and other wireless communication networks to access servers (not shown in the drawings) to acquire map data, traffic data and the like, periodically or at arbitrary times. Acquired map data are output to the map database 35 and/or memory unit 42 to update their stored map data. Acquired traffic data include congestion data and traffic light data including, for instance, time to change from red light to green light.

The actuators AC are actuators for operating various devices in relation to vehicle traveling, i.e., for traveling of the vehicle 100. The actuators AC include four motors 2 for driving the four drive wheels 1, respectively, a brake actuator for operating a braking device, and the turning actuator 9 for turning the front wheels 1FL and 1FR. Although the motors 2 are controlled by the inverters 3, as shown in FIG. 1, illustrations of the inverters 3 are omitted in FIG. 2.

The controller 40 is constituted by an electronic control unit (ECU). In FIG. 2, the controller 40 is integrally configured by consolidating multiple function-differentiated ECUs such as a motor control ECU, a turning control ECU and so on. Optionally, these ECUs can be individually provided. The controller 40 incorporates a computer including a CPU or other processing unit (a microprocessor) 41 for executing a processing in relation to travel control, the memory unit (a memory) 42 of RAM, ROM, hard disk and the like, and an input-output interface or other peripheral circuits not shown in the drawings.

The memory unit 42 stores high-accuracy detailed map data including, inter alia, lane center position data and lane boundary line data. More specifically, road data, traffic regulation data, address data, facility data, telephone number data and the like are stored as map data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 42 also stores various programs for performing processing, and threshold values used in the programs, etc.

As functional configurations in relation to mainly self-driving, the processing unit 41 includes a subject vehicle position recognition unit 43, an exterior recognition unit 44, an action plan generation unit 45, and a driving control unit 46.

The subject vehicle position recognition unit 43 recognizes map position of the vehicle 100 (subject vehicle position) based on subject vehicle position data calculated by the GPS unit 34 and map data stored in the map database 35. Optionally, the subject vehicle position can be recognized using map data (building shape data and the like) stored in the memory unit 42 and ambience data of the vehicle 100 detected by the external sensor group 31, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 37.

The exterior recognition unit 44 recognizes external circumstances around the vehicle 100 based on signals from cameras, LIDERs, RADARs and the like of the external sensor group 31. For example, it recognizes position, speed and acceleration of nearby vehicles (forward vehicle or rearward vehicle) driving in the vicinity of the vehicle 100, position of vehicles stopped or parked in the vicinity of the vehicle 100, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 45 generates a driving path (target path) of the vehicle 100 from present time point to a certain time ahead based on, for example, a target route computed by the navigation unit 36, subject vehicle position recognized by the subject vehicle position recognition unit 43, and external circumstances recognized by the exterior recognition unit 44. When multiple paths are available on the target route as target path candidates, the action plan generation unit 45 selects from among them the path that optimally satisfies legal compliance, safe efficient driving and other criteria, and defines the selected path as the target path. The action plan generation unit 45 then generates an action plan matched to the generated target path. An action plan is also called "travel plan".

The action plan includes action plan data set for every unit time Δt (e.g., 0.1 sec) between present time point and a predetermined time period T (e.g., 5 sec) ahead, i.e., includes action plan data set in association with every unit time Δt interval. The action plan data include position data of the vehicle 100 and vehicle state data for every unit time Δt. The position data are, for example, target point data indicating 2D coordinate position on road, and the vehicle state data are vehicle speed data indicating vehicle speed, direction data indicating direction of the vehicle 100, and the like. Action plan is updated every unit time Δt.

The action plan generation unit 45 generates the target path by connecting position data at every unit time Δt between present time point and predetermined time period T ahead in time order. Further, the action plan generation unit 45 calculates acceleration (target acceleration) of sequential unit times Δt, based on vehicle speed (target vehicle speed) corresponding to target point data of sequential unit times Δt on target path. In other words, the action plan generation unit 45 calculates target vehicle speed and target acceleration. Optionally, the driving control unit 46 can calculate target acceleration.

The driving control unit 46 controls the actuators AC in accordance with drive mode (self-drive mode, manual drive mode). For example, in self-drive mode, the driving control unit 46 controls the actuators AC to drive the vehicle 100 along a target path generated by the action plan generation unit 45. More specifically, in self-drive mode, the driving control unit 46 calculates required driving force for achieving the target accelerations at each unit time included in the action plan generated by the action plan generation unit 45, taking running resistance caused by road gradient and the like into account. And the actuators AC are feedback controlled to bring actual acceleration detected by the internal sensor group 32, for example, into coincidence with target acceleration. In other words, it controls the actuators AC so that the vehicle 100 travels at target vehicle speed and target acceleration. On the other hand, in manual drive mode, the driving control unit 46 controls the actuators AC in accordance with driving instructions by the driver (accelerator opening angle, steering angle of the steering wheel 5, and the like) acquired from the internal sensor group 32.

In particular, the vehicle 100 according to the present embodiment includes four motors 2 for independently driving each of the wheels 1. Therefore, the driving control unit 46 controls driving force of motors 2 so that distribution of driving force on front and rear sides and distribution of driving force on left and right sides become predetermined distribution, while generating driving force corresponding to required driving force.

A point requiring attention here is that although the vehicle occupants are seated in seats, acceleration acting on the occupants varies with acceleration, deceleration, turning and other such traveling behavior of the vehicle 100. These acceleration changes force occupants to experience unintended riding posture changes that may give them unpleasant feelings. Likelihood of the driver and other passengers not keeping their eyes on the road ahead of the vehicle 100 is particularly high during traveling in self-drive mode, so that occupants are more apt to experience large changes in riding posture caused by vehicle behavior when in self-drive mode. In the following, this point is explained with focus on surface pressure changes acting on occupant seats.

Figure 3:
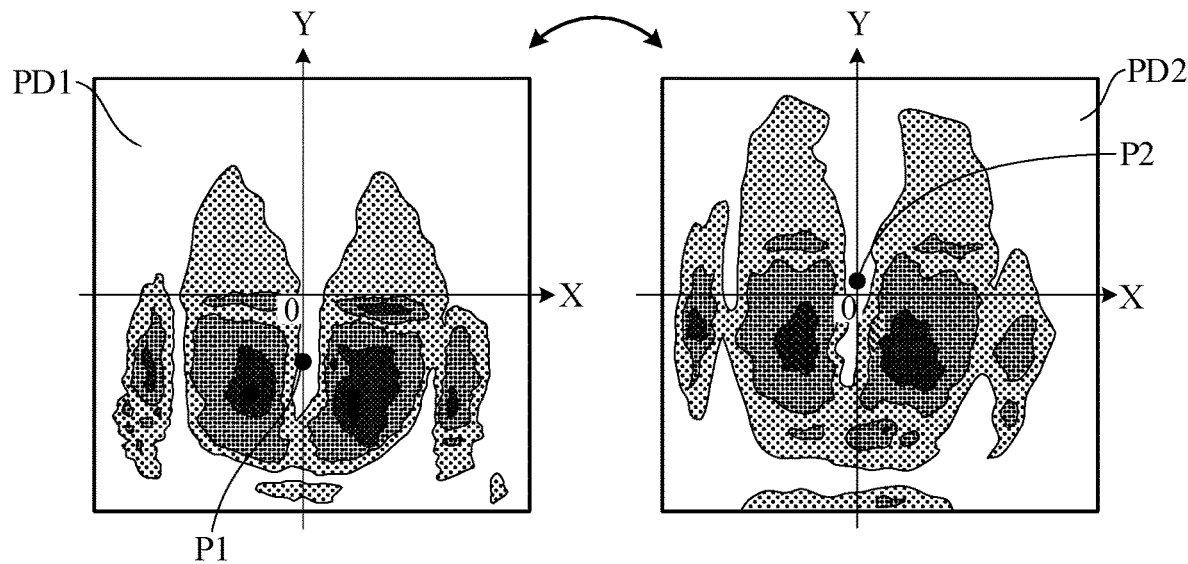
FIG. 3 is a diagram showing an example of a distribution of surface pressure owing to an occupant load on a seat back surface.

FIG. 3 is a diagram showing distribution of surface pressure owing to occupant load on seat back surface when an occupant is in seated condition. Left side of FIG. 3 is an example of surface pressure distribution PD1 in vehicle stopped or cruising state, for example, under condition of forward-rearward acceleration magnitude (absolute value) of not greater than predetermined value and lateral acceleration magnitude of not greater than predetermined value. Right side of FIG. 3 is an example of surface pressure distribution PD2 in vehicle decelerating state, for example, under condition of forward-rearward acceleration magnitude of not less than predetermined value and lateral acceleration of not greater than predetermined value. Center points P1 and P2 of the surface pressure distributions PD1 and PD2 represent surface pressure distribution centers, namely, representative positions (center positions). Taking center of the seat back surface as origin O, defining horizontal axis passing through origin O as X axis and defining vertical axis passing through origin O as Y axis, representative positions P1 and P2 can be represented by XY coordinates. In the following, coordinates of the representative positions P1 and P2 are expressed as (X1, Y1) and (X2, Y2), respectively.

In vehicle stopped or cruising state, occupants are little affected by acceleration of the vehicle 100 and maintain stable riding posture. Representative position P1 of surface pressure distribution PD1 in this case is sometimes called "reference position". On the other hand, since occupants assume forward leaning posture in vehicle decelerating state, representative position P2 of pressure distribution PD2 shifts upward (in positive Y direction), for example, from reference position P1. Moreover, in vehicle accelerating state, representative position P2 shifts downward (in negative Y direction), for example, from reference position P1; in vehicle right turning state, representative position P2 shifts leftward (in negative X direction) from reference position P1; and in vehicle left turning state, representative position P2 shifts rightward (in positive X direction) from reference position P1

When deviation of representative position P2 from reference position P1 is large, occupant discomfort increases owing to pronounced riding posture change. An attempt to eliminate or mitigate such discomfort by, for example, performing acceleration-deceleration of the vehicle 100 gradually is apt to cause actual driving force to diverge from required driving force and prevent performance of optimum driving actions. Therefore, as set out in the following, the present embodiment is configured as a driving force control apparatus capable of implementing riding posture constraint control for inhibiting occupant riding posture change while concurrently ensuring generation of actual driving force commensurate with required driving force.

FIG. 4 is a block diagram showing essential components of a driving force control apparatus 50 according to the present embodiment. The driving force control apparatus 50 is directed to control of traveling actions of the vehicle 100 and is configured as part of the vehicle control system 101 of FIG. 2.

As shown in FIG. 4, the driving force control apparatus 50 includes the controller 40 and, connected thereto, a self/manual drive select switch 33a, a vehicle speed sensor 32a, an acceleration sensor 32b, a vehicle weight sensor 32c, pressure sensors 38, and four motors 2 (only one shown). Although the motors 2 are controlled through associated inverters 3, illustration of the inverters 3 is omitted in FIG. 4.

The self/manual drive select switch 33a is a mode selection switch switched by driver operation, i.e., a switch for selecting between manual drive mode and self-drive mode, and is a member of the input-output unit 33 of FIG. 2. The vehicle speed sensor 32a, acceleration sensor 32b and vehicle weight sensor 32c are members of the internal sensor group 32 of FIG. 2.

The pressure sensors 38 are installed inside a seat back at predetermined intervals in horizontal direction and vertical direction so as to face seat back seating surface. The pressure sensors 38 detect seat occupant riding posture, more specifically, detect surface pressure (seat pressure) due to seated occupant load. Surface pressure distribution of FIG. 3 can be acquired using signals from the pressure sensors 38. The pressure sensors 38 are also members of the internal sensor group 32 of FIG. 2.

The controller 40 includes as main functional configurations a required driving force calculation unit 401, a reference position setting unit 402, a determination unit 403, and a distribution control unit 404. The required driving force calculation unit 401, reference position setting unit 402, determination unit 403 and distribution control unit 404 are, for example, members of the driving control unit 46 of FIG. 2.

In self-drive mode, the required driving force calculation unit 401 calculates required driving force for obtaining unit time specific target acceleration calculated by the action plan generation unit 45 (FIG. 2). On the other hand, in manual drive mode, the required driving force calculation unit 401 calculates required driving force in accordance accelerator opening angle (amount of accelerator pedal manipulation) detected by an accelerator position sensor that is a member of the internal sensor group 32.

When magnitudes (absolute values) of forward-rearward acceleration Ga and lateral acceleration Gb detected by the acceleration sensor 32b are not greater than predetermined value Ga1 and predetermined value Gb1, respectively, the reference position setting unit 402 sets coordinates (X1, Y1) of reference position P1 of seat back surface pressure distribution based on detection signals of multiple pressure sensors 38. Specifically, this results in center position (center of gravity position) of surface pressure distribution being set as reference position. Predetermined values Ga1 and Gb1 are predefined thresholds for determining whether occupants are apt to be caused discomfort by change in vehicle behavior. Accelerations Ga and Gb of not greater than predetermine values Ga1 and Gb1 are defined to mean no discomfort expected. Change of reference position P1 when accelerations Ga and Gb are not greater than predetermine values Ga1 and Gb1 is determined to be attributable not to change in acceleration of the vehicle 100 but to intentional change of sitting posture by the occupant concerned. Insofar as accelerations Ga and Gb are not greater than predetermined values Ga1 and Gb1, coordinates (X1, Y1) of reference position P1 are regularly updated, and their latest values immediately before accelerations Ga and Gb exceed predetermined values Ga1 and Gb1 are stored in the memory unit 42.

The determination unit 403 determines whether forward-rearward driving force distribution or lateral driving force distribution of the vehicle 100 needs to be changed, i.e., whether riding posture constraint control is necessary. Specifically, when forward-rearward acceleration Ga is greater than predetermined value Ga1 or when lateral acceleration Gb is greater than predetermined value Gb1, position deviation between reference position P1 (X1, Y2) stored in the memory unit 42 and representative position P2 (X2, Y2) detected by the pressure sensors 38, i.e., position deviation $\Delta X$ in X direction and position deviation $\Delta Y$ in Y direction, is first calculated.

Position deviation $\Delta X$ is value of X2 minus X1 (X2−X1) and position deviation $\Delta Y$ is value of Y2 minus Y1 (Y2−Y1). This means that position deviation $\Delta X$ is positive when representative position P2 shifts rightward of reference position P1 and that position deviation $\Delta X$ is negative when representative position P2 shifts leftward of reference position P1. Position deviation $\Delta Y$ is positive when representative position P2 shifts upward of reference position P1 and position deviation ΔY is negative when representative position P2 shifts downward of reference position P1.

The determination unit 403 determines that forward-rearward driving force distribution needs to be changed when magnitude (absolute value) of position deviation ΔY is equal to or greater than predetermined value ΔY1 and determines that lateral driving force distribution needs to be changed when magnitude (absolute value) of position deviation ΔX is equal to or greater than predetermined value ΔX1. Predetermined values ΔX1 and ΔY1 are predefined thresholds for determining whether occupants are apt to be caused discomfort by change in vehicle behavior. Occupants are determined not to feel discomfort insofar as magnitudes (absolute values) of position deviations ΔX and ΔY are less than predetermined values ΔX1 and ΔY1. Predetermined values ΔX1 and ΔY1 are typically fixed values. Alternatively, predetermined values ΔX1 and ΔY1 can be variables dependent on vehicle speed or acceleration.

When the determination unit 403 determines that no change in front-rear wheel and left-right wheel driving force distribution is necessary, the distribution control unit 404 ensures generation of required driving force calculated by the required driving force calculation unit 401 while concomitantly controlling front-rear wheel and left-right wheel driving force distribution to normal driving force distribution calculated by the driving control unit 46. For example, it controls both front-rear wheel and left-right wheel driving force distribution to optimum fuel efficiency driving force distribution (e.g., 1:1). On the other hand, when the determination unit 403 determines that change in front-rear wheel or left-right wheel driving force distribution is necessary, the distribution control unit 404 changes front-rear wheel or left-right wheel driving force distribution while concomitantly ensuring generation of required driving force calculated by the required driving force calculation unit 401.

Specifically, the distribution control unit 404 calculates position deviation ΔY by subtracting Y coordinate Y1 of reference position P1 from Y coordinate Y2 of representative position P2 and calculates target forward-rearward driving force distribution based on calculated position deviation ΔY. Namely, a target driving force distribution is calculated that minimizes position deviation ΔY. For example, when position deviation ΔY is minus, ratio of driving force of front wheels 1FL, 1FR relative to rear wheels 1RL, 1RR (front-wheel driving force ratio) is decreased in proportion as ΔY is smaller (absolute value is larger). For example, front-wheel driving force ratio is made 0 or negative. In the case of negative front-wheel driving force ratio, driving torque is applied to the rear wheels and regenerative torque is applied in the front wheels. On the other hand, when position deviation ΔY is positive, ratio of driving force of rear wheels 1RL, 1RR relative to front wheels 1FL, 1FR (rear-wheel driving force ratio) is decreased in proportion as ΔY is greater. For example, rear-wheel driving force ratio is made 0 or negative. In the case of negative rear-wheel driving force ratio, driving torque is applied to the front wheels and regenerative torque is applied to the rear wheels.

Moreover, the distribution control unit 404 calculates position deviation ΔX by subtracting X coordinate X1 of reference position P1 from X coordinate X2 of representative position P2 and calculates target left-right driving force distribution based on calculated position deviation ΔX. Namely, a target driving force distribution is calculated that minimizes position deviation ΔX. For example, when position deviation ΔX is positive, ratio of driving force of right wheels 1FR, 1RR relative to left wheels 1FL, 1RL is decreased in proportion as ΔX is greater. On the other hand, when position deviation ΔX is negative, ratio of driving force of left wheels 1FL, 1RL relative to right wheels 1FR, 1RR is decreased in proportion as ΔX is smaller (absolute value is larger).

Alternatively, the distribution control unit 404 can calculate target front-rear driving force distribution based not solely on position deviation ΔY but also on total forward-rearward driving force or braking force of the vehicle 100. For example, it is optionally possible, prior to changing driving force distribution, to calculate total forward-rearward driving force or braking force of the vehicle 100 based on vehicle speed detected by the vehicle speed sensor 32a, forward-rearward acceleration detected by the acceleration sensor 32b and vehicle weight detected by the vehicle weight sensor 32c, and to calculate target front-rear wheel driving force distribution based on calculated total driving force or braking force and position deviation ΔY.

In addition, the distribution control unit 404 can calculate target left-right wheel driving force distribution based not solely on position deviation ΔX but also on lateral force of the vehicle 100. For example, it is optionally possible, prior to changing driving force distribution, to calculate lateral force of the vehicle 100 based on vehicle speed detected by the vehicle speed sensor 32a, lateral acceleration detected by the acceleration sensor 32b and vehicle weight detected by the vehicle weight sensor 32c, and to calculate target left-right wheel driving force distribution based on calculated lateral force and position deviation ΔX.

The distribution control unit 404 outputs control signals to the motors 2 so as to control forward-rearward driving force distribution and lateral driving force distribution to the calculated target driving force distributions. At this time, overall torque of the motors is controlled to ensure that the vehicle 100 can generate required driving force, i.e., so that total driving force of the motors 2 meets required driving force.

Figure 5A:
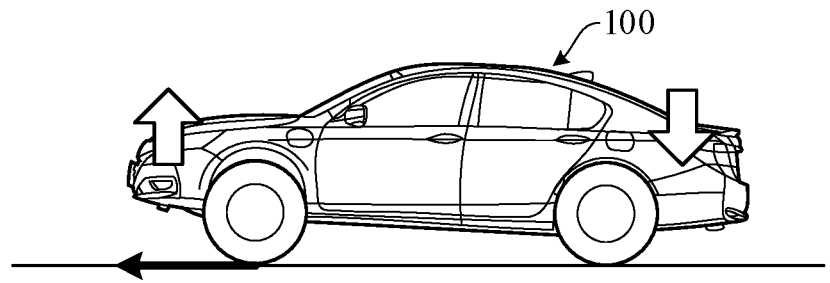
FIG. 5A is a diagram showing an example of a change of a vehicle behavior when the vehicle rapidly accelerates.
Figure 5B:
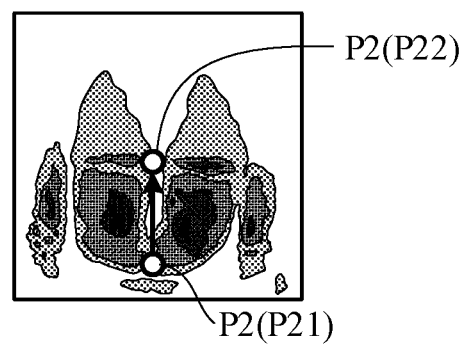
FIG. 5B is a diagram showing an example of a change of a surface pressure distribution on the seat back when the vehicle rapidly accelerates.
Figure 5C:
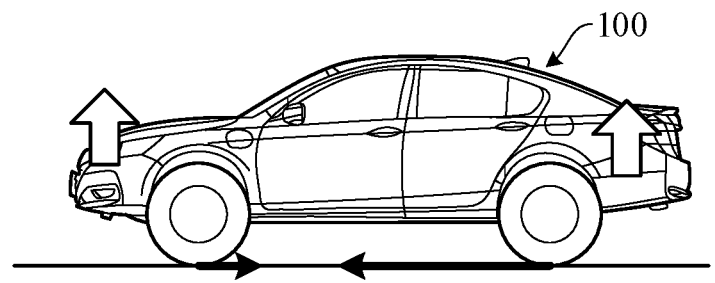
FIG. 5C is a diagram showing an example of actions when the driving force control apparatus of FIG. 4 is applied to the vehicle in a situation of FIG. 5A.
Figure 6A:
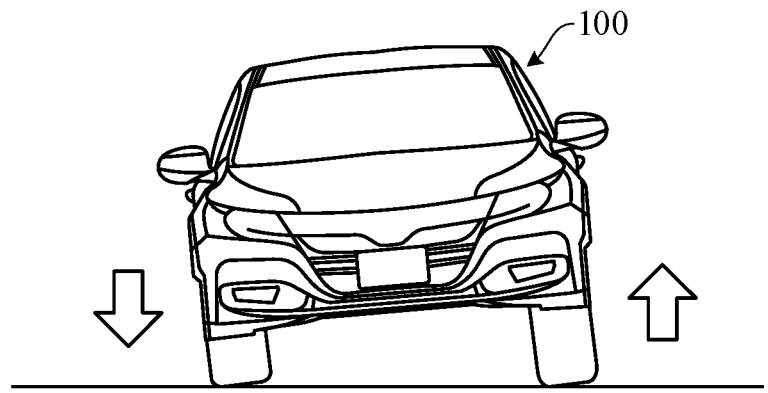
FIG. 6A is a diagram showing an example of a change of a vehicle behavior when the vehicle turns left.
Figure 6B:
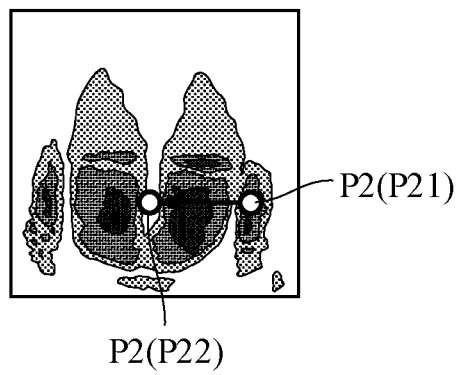
FIG. 6B is a diagram showing an example of a change of a surface pressure distribution on the seat back when the vehicle turns left.
Figure 6C:
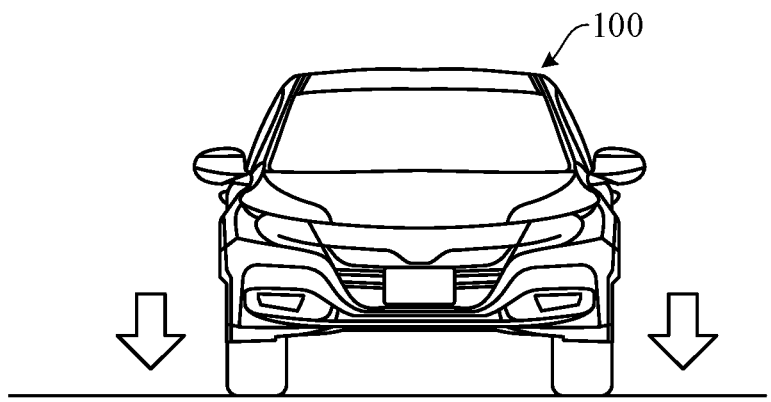
FIG. 6C is a diagram showing an example of actions when the driving force control apparatus of FIG. 4 is applied to the vehicle in a situation of FIG. 6A.

FIGS. 5A to 5C are diagrams elucidating examples of how driving force distribution changes when vehicle rapidly accelerates, and FIGS. 6A to 6C are diagrams elucidating examples of how driving force distribution changes when vehicle turns left.

When the vehicle 100 rapidly accelerates as illustrated in FIG. 5A, an occupant is thrust toward seat side (rearward), and, as shown in FIG. 5B, representative position P2 of surface pressure distribution owing to occupant load shifts in negative Y direction (to point P21) relative to reference position P1 (FIG. 3) set by the reference position setting unit 402. In response, the distribution control unit 404 outputs control signals to the motors 2 in accordance with Y-direction position deviation ΔY of representative position P2 from reference position P1, whereby, as shown in FIG. 5C, regenerative torque is applied to the front wheels 1FL and 1FR and driving torque applied to the rear wheels 1RL, 1RR is increased so that the vehicle 100 generates required driving force. Magnitude of regenerative torque is increased in proportion as absolute value of position deviation ΔY is greater. Therefore, as indicated by an arrow in FIG. 5B, representative position P2 moves in positive Y direction (upward), i.e., toward reference position P1 side (to point P22). To the contrary, when representative position P2 shifts in positive Y direction owing to rapid deceleration of the vehicle 100, the distribution control unit 404 applies regenerative torque to the rear wheels 1RL and 1RR and increases driving torque applied to the front wheels 1FL and 1FR.

When the vehicle 100 turns left as illustrated in FIG. 6A, an occupant is thrust toward seat right side, and, as shown in FIG. 6B, representative position P2 of surface pressure distribution owing to occupant load shifts in positive X direction (rightward) relative to reference position P1 (FIG. 3) set by the reference position setting unit 402 (to point P21). In response, the distribution control unit 404 outputs control signals to the motors 2 in accordance with X-direction position deviation ΔX of representative position P2 from reference position P1, whereby, as shown in FIG. 6C, braking force applied to the outer side right wheels 1FR and 1RR is increased. Magnitude of braking torque is increased in proportion as position deviation ΔX is greater. Therefore, as indicated by an arrow in FIG. 6B, representative position P2 moves in negative X direction (leftward), i.e., toward reference position P1 side (to point P22). To the contrary, when the vehicle 100 turns right and causes representative position P2 to shift in negative X direction, the distribution control unit 404 increases braking torque applied to the left wheels 1FL and 1RL.

Figure 7:
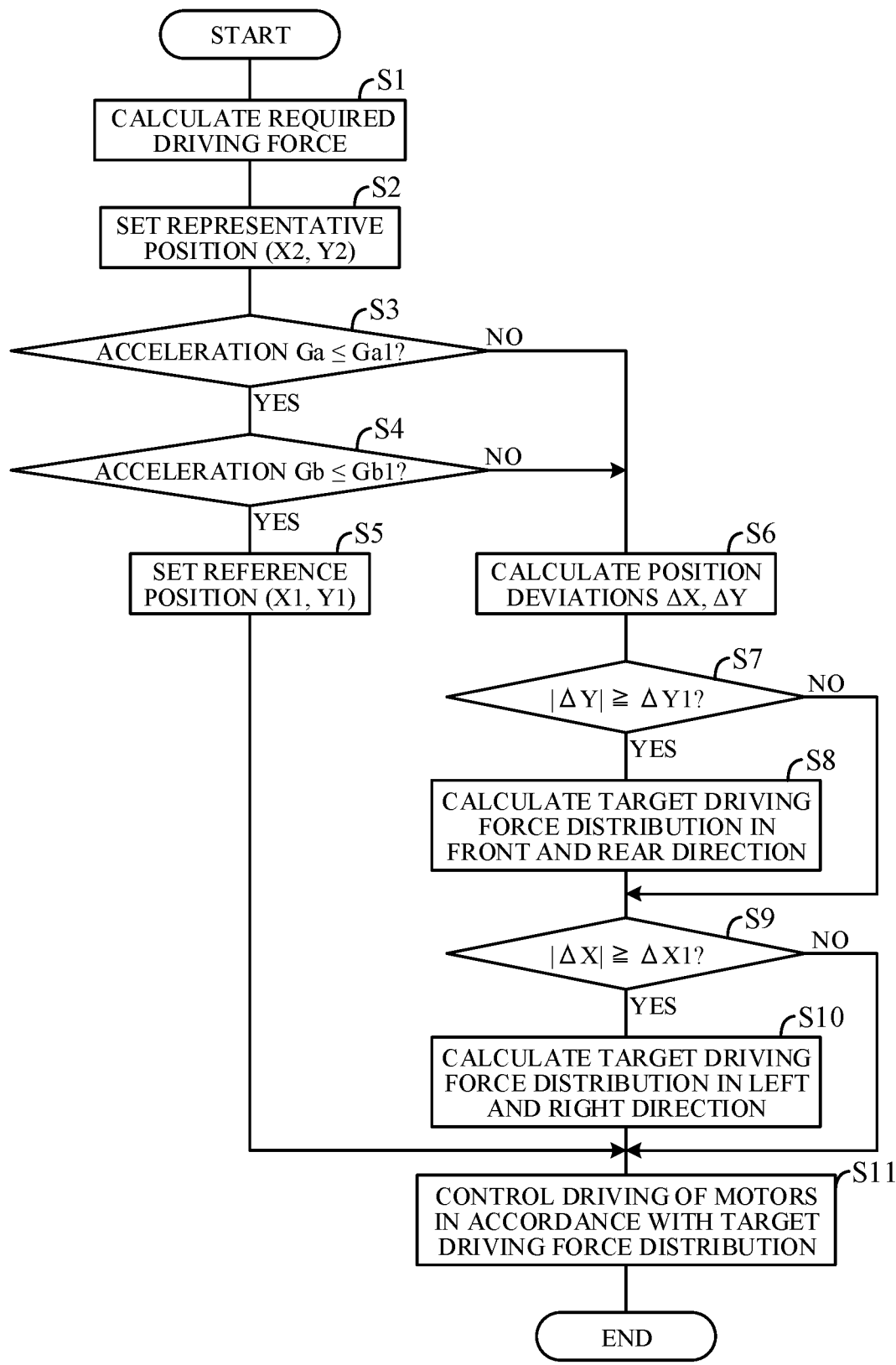
FIG. 7 is a flowchart showing an example of processing performed by a controller of FIG. 4.

FIG. 7 is a flowchart showing an example of processing performed by the CPU of the controller 40 of FIG. 4 in accordance with a program stored in memory in advance. The processing shown in this flowchart is, for example, started when self-drive drive mode is selected by the self/manual drive select switch 33a and periodically repeated while in self-drive mode.

First, in S1 (processing Step), required driving force for obtaining unit time specific target acceleration calculated by the action plan generation unit 45 is calculated. Next, in S2, coordinates (X2, Y2) of representative position P2 of surface pressure distribution of seat back surface are defined based on signals from the pressure sensors 38. Next, in S3, whether magnitude (absolute value) of forward-rearward acceleration Ga detected by the acceleration sensor 32b is equal to or less than predetermined value Ga1 is determined. If an affirmative decision is made in S3, the routine proceeds to S4 to determine whether magnitude (absolute value) of lateral acceleration Gb detected by the acceleration sensor 32b is equal to or less than predetermined value Gb1.

If an affirmative decision is made in S4, the routine proceeds to S5, in which representative position P2 (X2, Y2) defined in S2 is set as reference position P1 (X1, Y1), whereafter the routine proceeds to S11. In step S11, driving of the motors 2 is controlled in accordance with target driving force distribution. In particular, in S11 following S5, torques of the front left and right and rear left and right motors 2 are controlled so as to power traveling of the vehicle 100 by driving force corresponding to required driving force and so as to implement predetermined driving force distribution in normal traveling state calculated by the driving control unit 46. In such a case of acceleration Ga being equal to or less than predetermined value Ga1 and acceleration Gb being equal to or less than predetermined value Gb1, reference position P1 is constantly updated in S5.

On the other hand, if a negative decision is made in either S3 or S4, riding posture constraint control is determined to be necessary, and the routine proceeds to S6. In S6, X direction and Y direction position deviations ΔX and ΔY between reference position P1 (X1, Y1) set in S5 and representative position P2 (X2, Y2) thereafter defined in S2 are calculated. Specifically, value of X2 minus X1 and value of Y2 minus Y1 are calculated.

Next, in S7, whether absolute value of Y direction position deviation ΔY calculated in S6 is equal to or greater than predetermined value ΔY1 is determined. If an affirmative decision is made in S7, the routine proceeds to S8, and if a negative decision is made, the routine skips S8 and proceeds to S9. In S8, target driving force distribution between front wheels 1FL, 1FR and rear wheels 1RL, 1RR is calculated based on position deviation ΔY. Specially, target driving force distribution for controlling position deviation ΔY to less than predetermined value ΔY1 is calculated. Alternatively, it is possible to calculate total driving force or braking force of the vehicle 100 based on vehicle speed detected by the vehicle speed sensor 32a, forward-rearward acceleration Ga detected by the acceleration sensor 32b and vehicle weight detected by the vehicle weight sensor 32c, and to calculate target front-rear wheel driving force distribution based on calculated total driving force or braking force and position deviation ΔY.

In S9, whether absolute value of X direction position deviation ΔX calculated in S6 is equal to or greater than predetermined value ΔX1 is determined. If an affirmative decision is made in S9, the routine proceeds to S10, and if a negative decision is made, the routine skips S10 and proceeds to S11. In S10, target driving force distribution between left wheels 1FL, 1RL and right wheels 1FR, 1RR is calculated based on position deviation ΔX. Specially, target driving force distribution for controlling position deviation ΔX to less than predetermined value ΔX1 is calculated. Alternatively, it is possible to calculate lateral force of the vehicle 100 based on vehicle speed detected by the vehicle speed sensor 32a, lateral acceleration Gb detected by the acceleration sensor 32b and vehicle weight detected by the vehicle weight sensor 32c, and to calculate target left-right wheel driving force distribution based on calculated lateral force and position deviation ΔX.

Next, in S11, driving of the motors 2 is controlled in accordance with target driving force distribution. For example, driving of the motors 2 is controlled in accordance with target driving force distribution calculated in S8 and S10. At this time, overall torque of the motors is concomitantly controlled so that the vehicle 100 travels at required driving force calculated in S1. As a result, vehicle total driving force can be maintained unchanged at value corresponding to required driving force and position deviations ΔX and ΔY minimized solely by changing driving force distribution. If a negative decision is made in S7 and a negative decision is made in S9, the motors 2 are controlled in S11 so that forward-rearward wheel driving force distribution and left-right wheel driving force distribution assume driving force distributions in normal traveling state calculated by the driving control unit 46.

Figure 8:
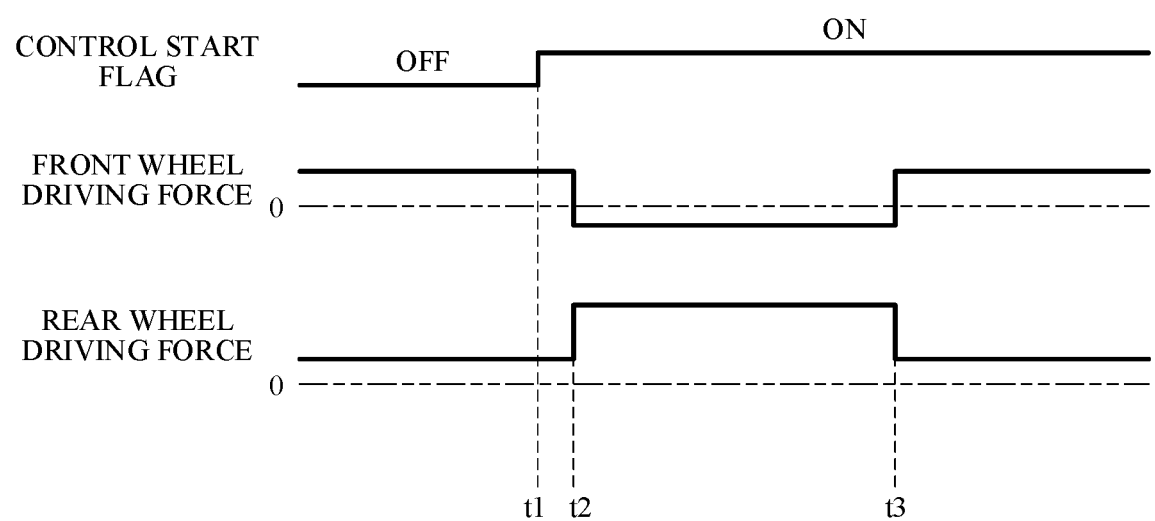
FIG. 8 is a time chart showing an example of actions performed by the driving force control apparatus according to the embodiment of the invention.

FIG. 8 is a time chart showing an example of operation by the driving force control apparatus 50 according to this embodiment, particularly an example of operation when the vehicle 100 accelerates rapidly. As shown in FIG. 8, forward-rearward acceleration Ga is initially not greater than predetermined value Ga1, and a control start flag indicating start of riding posture constraint control is OFF. At this time, both front wheel 1FL, 1FR driving force (front wheel driving force) and rear wheel 1RL, 1RR driving force (rear wheel driving force) are greater than 0.

When, at time t1, forward-rearward acceleration Ga exceeds predetermined value Ga1 and absolute value of Y direction position deviation ΔY becomes equal to or greater than ΔY1, i.e., when representative position P2 of surface pressure distribution of seat back surface shifts downward of reference position P1 by predetermined value ΔY1 or greater, the control start flag is turned ON and riding posture constraint control is started. As a result, target forward-rearward driving force distribution changes (S8), front wheel driving force becomes negative at time t2, and rear wheel driving force is increased correspondingly (S11). As representative position P2 of surface pressure distribution of seat back surface therefore approaches reference position P1, absolute value of position deviation ΔY between representative position P2 and reference position P1 can be reduced to less than predetermined value ΔY1.

At this time, total driving force is kept at a value corresponding to required driving force and stays constant between before and after change of driving force distribution. This enables change of occupant riding posture to be constrained by changing force acting on the occupant while concomitantly maintaining traveling acceleration at a value corresponding to required driving force. Occupant comfort can therefore be enhanced. When position deviation ΔY falls to below predetermined value ΔY1 at time t3, front wheel driving force and rear wheel driving force return to original values (e.g., optimum values for fuel efficiency).

The present embodiment can achieve advantages and effects such as the following:

(1) The driving force control apparatus 50 includes: the required driving force calculation unit 401 for calculating required driving force; the pressure sensors 38 for detecting seat riding posture of the occupant; the acceleration sensor 32b for detecting acceleration Ga, Gb of the vehicle 100; the four motors 2 for generating vehicle driving force in a manner enabling change of forward-rearward and left-right driving force distribution; and the distribution control unit 404 responsive to detection by the acceleration sensor 32b of forward-rearward acceleration Ga of magnitude equal to or greater than predetermined value Ga1 or left-right acceleration Gb of magnitude equal to or greater than predetermined value Gb1 and detection by the pressure sensors 38 of riding posture change of or greater than predetermined degree, i.e., detection of occupant weight-load-attributable representative position P2 offset from reference position P1 on seat back surface by predetermined value ΔX1, ΔY1 or greater, for controlling the motors 2 to change forward-rearward or left-right driving force distribution to target driving force distribution capable of constraining riding posture change, while concomitantly ensuring generation of driving force corresponding to required driving force calculated by the required driving force calculation unit 401 (FIG. 4).

In a case where occupant riding posture changes with change of forward-rearward or left-right acceleration Ga or Gb owing to acceleration, deceleration, turning or the like of the vehicle 100, therefore, such occupant riding posture change can be minimized by changing driving force distribution while maintaining vehicle driving force commensurate with required driving force. As a result, discomfort to occupants during acceleration or deceleration of the vehicle 100 can be minimized without major divergence of actual driving force from required driving force of the vehicle 100.

(2) The pressure sensors 38 detect central position on seat back surface (representative position P2) of occupant load acting on back of the seat in which the occupant is seated. The driving force control apparatus 50 further includes the reference position setting unit 402 for setting reference position P1 of occupant load to representative position P2 detected by the pressure sensors 38 prior to detection by the acceleration sensor 32b of acceleration Ga, Gb of magnitude equal to or greater than predetermined value Ga1, Gb1 (FIG. 4). When acceleration Ga, Gb of magnitude equal to or greater than predetermined value Ga1, Gb1 is detected by the acceleration sensor 32b and representative position P2 whose deviation ΔX, ΔY with respect to reference position P1 set by the reference position setting unit 402 is equal to or greater than predetermined value ΔX1, ΔY1 is detected by the pressure sensors 38, the distribution control unit 404 controls the motors 2 so as to change forward-rearward or left-right driving force distribution to target driving force distribution, while concomitantly ensuring generation of driving force corresponding to required driving force calculated by the required driving force calculation unit 401. Change of driving force distribution based on change of representative position P2 from reference position P1 on the seat back surface in this manner facilitates accurate determination of riding posture change detrimental to occupant comfort and enables enhancement of occupant comfort when behavior of the vehicle 100 changes.

(3) When forward-rearward acceleration Ga of magnitude equal to or greater than predetermined value Ga1 is detected by the acceleration sensor 32b and representative position P2 whose vertical deviation ΔY with respect to reference position P1 set by the reference position setting unit 402 is equal to or greater than predetermined value ΔY1 is detected by the pressure sensors 38, the distribution control unit 404 controls the motors 2 so as to apply driving torque to one set between the set of front wheels 1FL, 1FR and the set of rear wheels 1RL, 1RR and apply regenerative torque to the other set. By applying driving torque to one set between the sets of front and rear wheels and applying regenerative torque to the other set in this manner, position deviation ΔY can be easily reduced to less than predetermined value ΔY1.

(4) The driving force control apparatus 50 performs riding posture constraint control involving change of driving force distribution in accordance with position deviations ΔX, ΔY on condition of self-drive mode being selected, The reasoning in this is that when in manual drive mode position deviation ΔX, ΔY sometime change because an occupant intentionally changes riding posture to cope with acceleration change, but since the occupant feels little discomfort in such a case, need to implement driving force distribution for restoring original riding posture is minimal. Since the present embodiment is adapted taking this point into consideration to perform riding posture constraint control when in self-drive mode, occupant discomfort due to riding posture change at time of vehicle 100 behavior change can be effectively eliminated.

Various modifications of the present embodiment are possible. Some examples are explained in the following. In the above embodiment, riding posture of the occupant is detected by the pressure sensors 38 installed in the seat back. In other words, so as to detect a representative position on a seat surface of an occupant load acting on a seat in which an occupant is seated, a representative position detecting part is provided. However, a posture detecting part is not limited to the above configuration. For example, the riding posture may be detected from image of the occupant taken by a camera. The riding posture may be detected based on signals from pressure sensors provided in a seat cushion or a headrest in addition to the seat back.

Although in the above embodiment, accelerations in the front and rear direction and the left and right direction are detected by the acceleration sensor 32b serving as an acceleration detecting part, the acceleration detecting part may detect only acceleration in the front and rear direction or only acceleration in the left and right direction. Although in the above embodiment, four motors 2 corresponding to four drive wheels are configured to change driving force distributions in the front and rear drive wheels and in the left and right drive wheels, a driving force generation part is not limited to the above configuration. For example, the driving force distribution may be changed by providing a clutch mechanism for transmitting driving force to drive wheels and controlling the clutch mechanism.

Although in the above embodiment, driving force distributions in the front and rear direction and in the left and right direction are changed though a riding posture constraint control, only driving force distribution in the front and rear direction or in the left and right direction may be changed through the riding posture constraint control. In other words, as long as controlling the driving force generation part so as to change the driving force distribution to a target driving force distribution to suppress a change of the riding posture while generating the required driving force calculated by the calculation unit when a magnitude of the acceleration detected by the acceleration detecting part is greater than or equal to a predetermined magnitude and a degree of change of the riding posture detected by the posture detecting part is greater than or equal to a predetermined degree, the distribution control unit 404 serving as a driving force control unit is not limited to the above configuration.

Although in the above embodiment, the vehicle 100 is configured as a four-wheel-drive vehicle, it may be configured as a front-drive vehicle or rear-drive vehicle. In this case, the driving force distribution in the front and rear direction can be changed by controlling drive torque of drive wheels side and brake torque of driven wheels side (operation of brake device). Although the riding posture constraint control is performed assuming that drive mode is switched to self-drive mode, it is also performed in manual drive mode. In this case, a required driving force in accordance with a manipulation of a driver can be calculated based on signal from an accelerator sensor for detecting an accelerator opening angle and a vehicle speed sensor, for example.

The present invention can also be used as a driving force control method for controlling a driving force of the vehicle.

The above embodiment can be combined as desired with one or more of the above modifications. The modifications can also be combined with one another.

According to the present invention, discomfort to an occupant during acceleration or deceleration of a vehicle can be minimized without major divergence of actual driving force from required driving force of the vehicle.

Above, while the present invention has been described with reference to the preferred embodiments thereof, it will be understood, by those skilled in the art, that various changes and modifications may be made thereto without departing from the scope of the appended claims.

What is claimed is:

1. A driving force control apparatus, comprising:
    a posture detecting part configured to detect a riding posture of an occupant;
    an acceleration detecting part configured to detect an acceleration of a vehicle;
    a driving force generation part configured to generate a driving force in a manner enabling to change a driving force distribution between a front wheel and a rear wheel or between a left wheel and a right wheel; and
    an electronic control unit having a microprocessor and a memory, wherein
    the microprocessor is configured to perform:
        calculating a required driving force; and
        controlling the driving force generation part so as to change the driving force distribution to a target driving force distribution to suppress a change of the riding posture while generating the required driving force, when a magnitude of the acceleration detected by the acceleration detecting part is greater than or equal to a predetermined magnitude and a degree of change of the riding posture detected by the posture detecting part is greater than or equal to a predetermined degree.

2. The driving force control apparatus according to claim 1, wherein
    the posture detecting part includes a representative position detecting part configured to detect a representative position on a seat surface of an occupant load acting on a seat in which the occupant is seated, and
    the microprocessor is configured to perform
        setting the representative position detected by the representative position detecting part before the magnitude of the acceleration detected by the acceleration detecting part is greater than or equal to the predetermined magnitude, as a reference position of the occupant load, and
        the controlling including controlling the driving force generation part so as to change the driving force distribution to the target driving force distribution while generating the required driving force, when the magnitude of the acceleration detected by the acceleration detecting part is greater than or equal to the predetermined magnitude and a deviation between the representative position and the reference position is greater than or equal to a predetermined value.

3. The driving force control apparatus according to claim 2, wherein
    the microprocessor is configured to perform
    the controlling including controlling the driving force generation part so as to decrease a rate of the driving force of the rear wheel relative to the driving force of the front wheel, when the magnitude of the acceleration detected by the acceleration detecting part in a front and rear direction is greater than or equal to the predetermined magnitude and the deviation is greater than or equal to the predetermined value under a situation where the representative position is shifted on an upper side than the reference position, while so as to decrease a rate of the driving force of the front wheel relative to the driving force of the rear wheel, when the magnitude of the acceleration detected by the acceleration detecting part in the front and rear direction is greater than or equal to the predetermined magnitude and the deviation is greater than or equal to the predetermined value under a situation where the representative position is shifted on a lower side than the reference position.

4. The driving force control apparatus according to claim 3, wherein
    the microprocessor is configured to perform
    the controlling including controlling the driving force generation part so as to apply a driving torque to one of the front wheel and the rear wheel and apply a regenerative torque to the other of the front wheel and the rear wheel, when the magnitude of the acceleration detected by the acceleration detecting part in the front and rear direction is greater than or equal to the predetermined magnitude and the deviation is greater than or equal to the predetermined value under the situation where the representative position is shifted on the upper side or the lower side than the reference position.

5. The driving force control apparatus according to claim 2, wherein
    the microprocessor is configured to perform
    the controlling including controlling the driving force generation part so as to decrease a rate of the driving force of the right wheel relative to the driving force of the left wheel, when the magnitude of the acceleration detected by the acceleration detecting part in a left and right direction is greater than or equal to the predetermined magnitude and the deviation is greater than or equal to the predetermined value under a situation where the representative position is shifted on a right side than the reference position, while so as to decrease a rate of the driving force of the left wheel relative to the driving force of the right wheel, when the magnitude of the acceleration detected by the acceleration detecting part in the left and right direction is greater than or equal to the predetermined magnitude and the deviation is greater than or equal to the predetermined value under a situation where the representative position is shifted on a left side than the reference position.

6. The driving force control apparatus according to claim 1, further comprising
a mode selecting part configured to select one of a self-drive mode enabling a self-drive function and a manual drive mode disabling the self-drive function, wherein
the microprocessor is configured to perform
the controlling including controlling the driving force generation part so that the driving force distribution becomes the target driving force distribution corresponding to the degree of change of the riding posture when the magnitude of the acceleration detected by the acceleration detecting part is greater than or equal to the predetermined magnitude and the degree of change of the riding posture detected by the posture detecting part is greater than or equal to the predetermined degree under a situation where the self-drive mode is selected by the mode selecting part, while so that the driving force distribution becomes a predetermined target driving force distribution regardless of the degree of change of the riding posture detected by the posture detecting part under a situation where the manual drive mode is selected by the mode selecting part.

7. A driving force control apparatus, comprising:
a posture detecting part configured to detect a riding posture of an occupant;
an acceleration detecting part configured to detect an acceleration of a vehicle;
a driving force generation part configured to generate a driving force in a manner enabling to change a driving force distribution between a front wheel and a rear wheel or between a left wheel and a right wheel; and
an electronic control unit having a microprocessor and a memory, wherein
the microprocessor is configured to function as:
a calculation unit configured to calculate a required driving force; and
a driving force control unit configured to control the driving force generation part so as to change the driving force distribution to a target driving force distribution to suppress a change of the riding posture while generating the required driving force calculated by the calculation unit, when a magnitude of the acceleration detected by the acceleration detecting part is greater than or equal to a predetermined magnitude and a degree of change of the riding posture detected by the posture detecting part is greater than or equal to a predetermined degree.

8. The driving force control apparatus according to claim 7, wherein
the posture detecting part includes a representative position detecting part configured to detect a representative position on a seat surface of an occupant load acting on a seat in which the occupant is seated,
the microprocessor is configured to function as
a reference position setting unit configured to set the representative position detected by the representative position detecting part before the magnitude of the acceleration detected by the acceleration detecting part is greater than or equal to the predetermined magnitude, as a reference position of the occupant load, and
the driving force control unit is configured to control the driving force generation part so as to change the driving force distribution to the target driving force distribution while generating the required driving force, when the magnitude of the acceleration detected by the acceleration detecting part is greater than or equal to the predetermined magnitude and a deviation between the representative position detected by the representative position detecting part and the reference position set by the reference position setting unit is greater than or equal to a predetermined value.

9. The driving force control apparatus according to claim 8, wherein
the driving force control unit is configured to control the driving force generation part so as to decrease a rate of the driving force of the rear wheel relative to the driving force of the front wheel, when the magnitude of the acceleration detected by the acceleration detecting part in a front and rear direction is greater than or equal to the predetermined magnitude and the deviation is greater than or equal to the predetermined value under a situation where the representative position is shifted on an upper side than the reference position, while so as to decrease a rate of the driving force of the front wheel relative to the driving force of the rear wheel, when the magnitude of the acceleration detected by the acceleration detecting part in the front and rear direction is greater than or equal to the predetermined magnitude and the deviation is greater than or equal to the predetermined value under a situation where the representative position is shifted on a lower side than the reference position.

10. The driving force control apparatus according to claim 9, wherein
the driving force control unit is configured to control the driving force generation part so as to apply a driving torque to one of the front wheel and the rear wheel and apply a regenerative torque to the other of the front wheel and the rear wheel, when the magnitude of the acceleration detected by the acceleration detecting part in the front and rear direction is greater than or equal to the predetermined magnitude and the deviation is greater than or equal to the predetermined value under the situation where the representative position is shifted on the upper side or the lower side than the reference position.

11. The driving force control apparatus according to claim 8, wherein
the driving force control unit is configured to control the driving force generation part so as to decrease a rate of the driving force of the right wheel relative to the driving force of the left wheel, when the magnitude of the acceleration detected by the acceleration detecting part in a left and right direction is greater than or equal to the predetermined magnitude and the deviation is greater than or equal to the predetermined value under a situation where the representative position is shifted on a right side than the reference position, while so as to decrease a rate of the driving force of the left wheel relative to the driving force of the right wheel, when the magnitude of the acceleration detected by the acceleration detecting part in the left and right direction is greater than or equal to the predetermined magnitude and the deviation is greater than or equal to the predetermined value under a situation where the representative position is shifted on a left side than the reference position.

12. The driving force control apparatus according to claim 7, further comprising
a mode selecting part configured to select one of a self-drive mode enabling a self-drive function and a manual drive mode disabling the self-drive function, wherein
the driving force control unit is configured to control the driving force generation part so that the driving force distribution becomes the target driving force distribution corresponding to the degree of change of the riding posture when the magnitude of the acceleration detected by the acceleration detecting part is greater than or equal to the predetermined magnitude and the degree of change of the riding posture detected by the posture detecting part is greater than or equal to the predetermined degree under a situation where the self-drive mode is selected by the mode selecting part, while so that the driving force distribution becomes a predetermined target driving force distribution regardless of the degree of change of the riding posture detected by the posture detecting part under a situation where the manual drive mode is selected by the mode selecting part.

13. A driving force control method in a vehicle including a driving force generation part configured to generate a driving force in a manner enabling to change a driving force distribution between a front wheel and a rear wheel or between a left wheel and a right wheel, comprising:
detecting a riding posture of an occupant;
detecting an acceleration of the vehicle;
calculating a required driving force; and
controlling the driving force generation part so as to change the driving force distribution to a target driving force distribution to suppress a change of the riding posture while generating the required driving force, when a magnitude of the acceleration in the detecting is greater than or equal to a predetermined magnitude and a degree of change of the riding posture in the detecting is greater than or equal to a predetermined degree.

14. The driving force control method according to claim 13, wherein
the detecting of the riding posture includes detecting a representative position on a seat surface of an occupant load acting on a seat in which the occupant is seated,
the method further comprises setting the representative position detected in the detecting before the magnitude of the acceleration is greater than or equal to the predetermined magnitude, as a reference position of the occupant load, and
the controlling includes controlling the driving force generation part so as to change the driving force distribution to the target driving force distribution while generating the required driving force, when the magnitude of the acceleration is greater than or equal to the predetermined magnitude and a deviation between the representative position and the reference position is greater than or equal to a predetermined value.

15. The driving force control method according to claim 14, wherein
the controlling includes controlling the driving force generation part so as to decrease a rate of the driving force of the rear wheel relative to the driving force of the front wheel, when the magnitude of the acceleration in a front and rear direction is greater than or equal to the predetermined magnitude and the deviation is greater than or equal to the predetermined value under a situation where the representative position is shifted on an upper side than the reference position, while so as to decrease a rate of the driving force of the front wheel relative to the driving force of the rear wheel, when the magnitude of the acceleration in the front and rear direction is greater than or equal to the predetermined magnitude and the deviation is greater than or equal to the predetermined value under a situation where the representative position is shifted on a lower side than the reference position.

16. The driving force control method according to claim 15, wherein
the controlling includes controlling the driving force generation part so as to apply a driving torque to one of the front wheel and the rear wheel and apply a regenerative torque to the other of the front wheel and the rear wheel, when the magnitude of the acceleration in the front and rear direction is greater than or equal to the predetermined magnitude and the deviation is greater than or equal to the predetermined value under the situation where the representative position is shifted on the upper side or the lower side than the reference position.

17. The driving force control method according to claim 14, wherein
the controlling includes controlling the driving force generation part so as to decrease a rate of the driving force of the right wheel relative to the driving force of the left wheel, when the magnitude of the acceleration in a left and right direction is greater than or equal to the predetermined magnitude and the deviation is greater than or equal to the predetermined value under a situation where the representative position is shifted on a right side than the reference position, while so as to decrease a rate of the driving force of the left wheel relative to the driving force of the right wheel, when the magnitude of the acceleration in the left and right direction is greater than or equal to the predetermined magnitude and the deviation is greater than or equal to the predetermined value under a situation where the representative position is shifted on a left side than the reference position.

18. The driving force control method according to claim 13, further comprising
selecting one of a self-drive mode enabling a self-drive function and a manual drive mode disabling the self-drive function, wherein
the controlling includes controlling the driving force generation part so that the driving force distribution becomes the target driving force distribution corresponding to the degree of change of the riding posture when the magnitude of the acceleration is greater than or equal to the predetermined magnitude and the degree of change of the riding posture is greater than or equal to the predetermined degree under a situation where the self-drive mode is selected, while so that the driving force distribution becomes a predetermined target driving force distribution regardless of the degree of change of the riding posture under a situation where the manual drive mode is selected.

\* \* \* \* \*